Feb. 17, 1953      F. T. COFFEY, SR      2,628,526
MOTION-PICTURE VIEWER
Filed Nov. 22, 1948      3 Sheets—Sheet 1
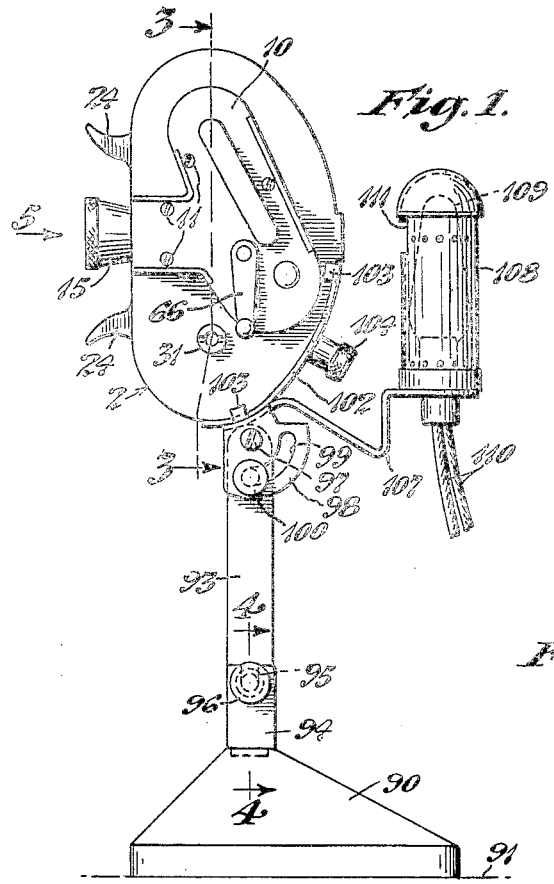
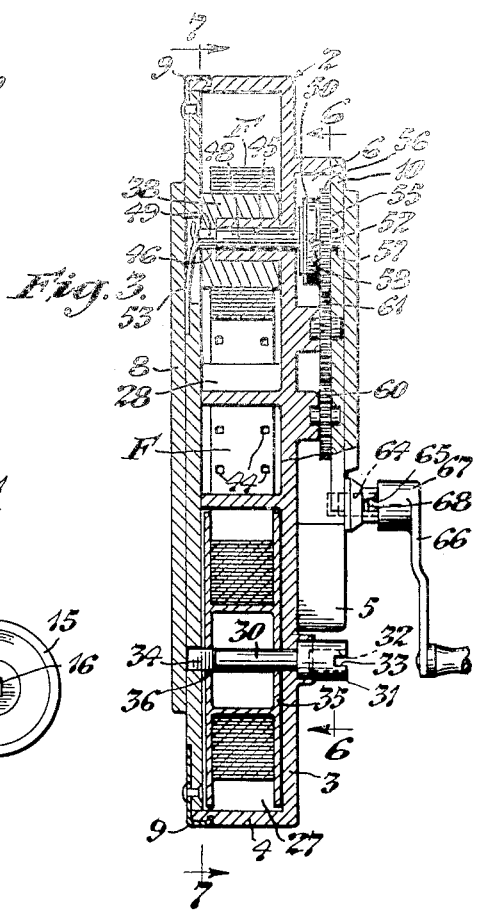
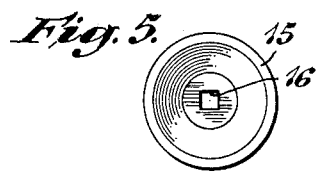
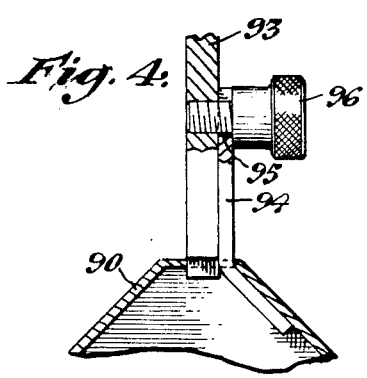
INVENTOR:
Francis T. Coffey, Sr.
BY
*William E. Hall*
ATTORNEY.

Feb. 17, 1953 — F. T. COFFEY, SR — 2,628,526
MOTION-PICTURE VIEWER
Filed Nov. 22, 1948 — 3 Sheets-Sheet 2
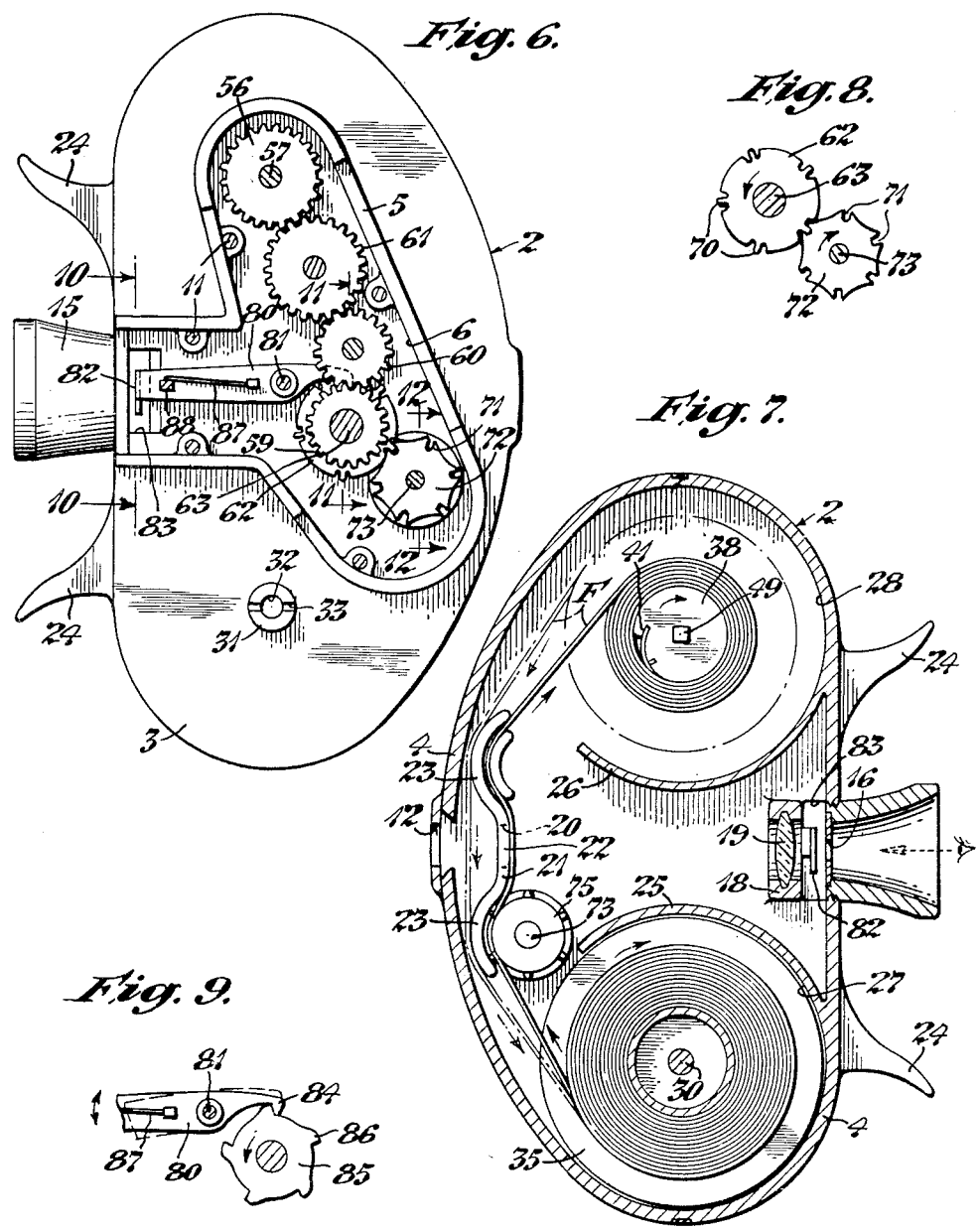
INVENTOR:
Francis T. Coffey, Sr.
BY William E. Hall
ATTORNEY.

Feb. 17, 1953   F. T. COFFEY, SR   2,628,526
MOTION-PICTURE VIEWER
Filed Nov. 22, 1948                            3 Sheets-Sheet 3
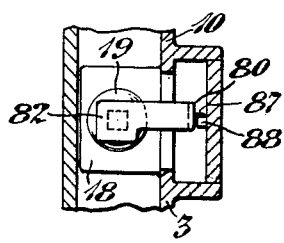
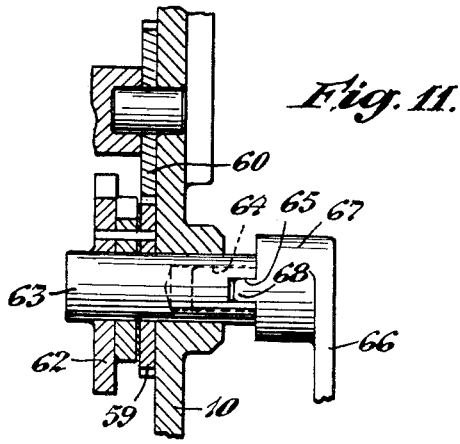
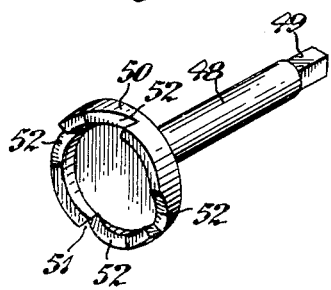
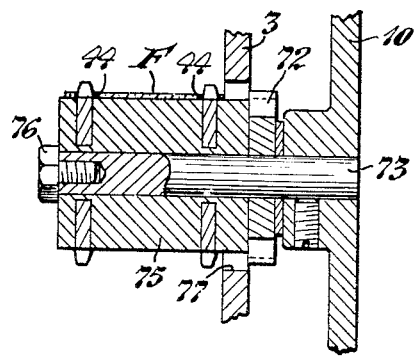
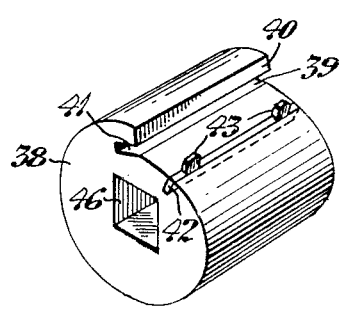
INVENTOR.
Francis T. Coffey, Sr.
BY
William E. Hall
ATTORNEY.

Patented Feb. 17, 1953

2,628,526

UNITED STATES PATENT OFFICE 2,628,526

MOTION-PICTURE VIEWER

Francis T. Coffey, Sr., Los Angeles, Calif.

Application November 22, 1948, Serial No. 61,470

2 Claims. (Cl. 88—17)

My invention relates to devices for facilitating the inspection of pictures, and particularly to a device, commonly termed a viewer, in which motion pictures and still pictures arranged in strip form can be viewed.

The present invention is directed to a picture viewer of the same general character as disclosed in my pending application for patent on Projector, Serial No. 714,719, filed December 7, 1946, now Patent No. 2,533,560, issued December 12, 1950, and also my pending application for patent on Motion Picture Viewer, Serial No. 5,960, filed February 3, 1948, now Patent No. 2,516,678, issued July 25, 1950, the present device incorporating many features of improvement thereover.

One object of the present invention is to provide a picture viewer embodying an improved means for supporting a coil of motion picture film within a casing to adapt the film to be fed from a rewind supply spool onto a wind-up spool or drum, the latter being of novel construction. The improved device also has manually operable means for selectively rotating the take-up drum or the rewind spool so as either to feed the film in a direction for viewing or in a reverse direction to cause it to be rewound upon the spool, either operation being carried out when the casing is closed.

Another object is to provide a device, of the character referred to, having a novel and ingenious film-feeding means, this means being actuated in timed relation to the rotation of the film wind-up drum and including an intermittently rotated feeding wheel for advancing the frames of pictures of the motion picture film with a step-by-step motion past an aperture in the side of the casing. A related object is to provide a simple yet positive driving means for intermittently rotating the film-feeding wheel in timed sequence with the film take-up drum, this driving means including a modified Geneva stop motion connected to be driven from the manually operable means for rotating the wind-up drum. A further related object is to provide film-feeding means in which the wind-up drum is rotated at a speed regulated to the film-feeding wheel so that stretching and breaking of the film is prevented.

Another object of the invention is to provide an improved shutter mechanism for alternately opening and closing the aperture to admit and shut off the transmission of light through the pictures of the film, said mechanism being oscillated in timed relation with the film-feeding wheel.

Another object is to provide improved means for guiding the film past the aperture in a manner such that bending or buckling of the film is prevented.

A further object is to provide a film viewer which is adapted to be either held in a hand of the user or mounted on a support or standard when viewing the film. A related object is to provide means whereby the device can be adjusted angularly on the support in accordance with the position of the operator when viewing the film. A further object is to provide a device which embodies means for illuminating the film, this means comprising an electric lamp carried by the supporting means and angularly adjustable with the device so as to maintain the light source in alignment with the aperture in the casing at all times.

A still further object is to provide a film-viewing device which is relatively simple in construction, convenient to operate, and highly efficient in performing its intended function.

Further objects are set forth in the following specification, which describes a preferred embodiment of the invention, by way of example, as illustrated by the accompanying drawings. In the drawings:

Fig. 1 is a side elevational view of my improved film viewer;

Fig. 2 is an enlarged sectional view of the means for detachably connecting the viewer to the supporting structure;

Fig. 3 is an enlarged vertical sectional view through the viewer device, taken on line 3—3 of Fig. 1;

Fig. 4 is a sectional view, taken on line 4—4 of Fig. 1;

Fig. 5 is a front view of the eyepiece, as viewed in the direction of arrow 5 in Fig. 1;

Fig. 6 is a vertical sectional view, taken on line 6—6 of Fig. 3;

Fig. 7 is a similar view, taken on line 7—7 of Fig. 3;

Fig. 8 is a detail of the Geneva stop motion in the drive for the film-feeding wheel;

Fig. 9 is a detail of the means for actuating the shutter;

Fig. 10 is a cross-sectional view, taken on line 10—10 of Fig. 6;

Fig. 11 is a cross-sectional view, taken on line 11—11 of Fig. 6;

Fig. 12 is a cross-sectional view, taken on line 12—12 of Fig. 6;

Fig. 13 is a perspective view of a spindle for the film take-up drum; and,

Fig. 14 is a perspective view of the take-up drum.

Referring to the drawings in detail, my improved film viewer comprises a substantially kidney-shaped casing, preferably made from plastic material, and having a side wall 3 and a flange-like perimetrical wall 4. A similar flange-like wall 5 projects from the side wall 3 and defines a compartment 6. A large cover 8 is detachably secured to the wall 4 of the casing by clips 9 and normally closes the open side of the casing. A smaller cover or closure 10 normally closes the open side of the compartment 6 and is held in place by screws 11. At the midportion of the curved part of the wall 4 is a square aperture 12 (Fig. 7) through which light can enter the interior of the casing 2. At the opposite straight side of the wall 4 is a tapped hole in which an eyepiece is screwed, the eyepiece having a square aperture 16 therein (Figs. 5 and 7). Disposed inwardly of the eyepiece 15 is a boss 17 in which a lens 18 is mounted, the lens being in alignment with the apertures 16 and 12. A third square aperture 20 is provided in a film guide 21 and aligned with the other apertures. The guide 21 is preferably formed integral with the side wall 3 of the casing 2, and has a central straight guide portion 22 and curved end portions 23. The straight portion of the walls 5 is also provided with a pair of spaced finger-pieces 24 by means of which the viewer can be held between the thumb and index finger of an operator. A pair of curved partitions 25 and 26 define, with the walls at the lower and upper ends of the casing 2, a pair of compartments 27 and 28 in which coils of the motion picture film F can be disposed, in the manner to be next explained.

A transverse spindle 30 is rotatable in the wall 3 and the closure 8, and has an outwardly projecting head 31 at one end provided with an axial hole 32 and a transverse slot 33. At its inner end, the spindle 30 has a flattened portion 34. A rewind film spool 35 is adapted to be slid onto the spindle 30 when the cover 8 is removed, the spool having a rectangular opening 36 for receiving the flattened end of the spindle to key these parts for unitary rotation. As will be apparent, the spool 30 is adapted to support a coil of the film F. Means, to be later described, are provided for intermittently drawing the film from the spool 35 and feeding it upwardly across the aperture 20 of the film guide 21.

From the guide 21 the film leads upwardly into the upper compartment 28 to be wound onto a wind-up drum 38. As shown in Fig. 14, the drum 38 is made in the form of a cylinder having a portion of its periphery cut away to provide a substantially flat rest 39 against which the end of the film F is placed, and a shoulder portion 40 which has a slit 41 therein for receiving the extreme end of the film. A thin bar 42 disposed in a radial slot of the drum 38 has a pair of spaced lugs 43 which engage in perforations 44 adjacent the edges of the film F. The drum 38 has an axial bore 45 which is cylindrical throughout the greater portion of its length, but which is square at one end, as indicated at 46. The drum 38 is adapted to be mounted on a second transverse spindle 48 which rotates in the wall 3 of the casing 2, the inner end 49 of the spindle being made square to allow it to enter the square hole 46 of the drum so as to key these parts together. As shown in Fig. 3, the outer end of the spindle 48 is disposed in the compartment 6 and provided with a disc-like head 50 which forms a clutch element. The outer face of the clutch element 50 is provided with a plurality of recesses 51 each having a sloping side 52. The spindle 48 is normally urged outwardly or toward the right, as viewed in Fig. 3, by a leaf spring 53 which is carried by the cover 8 and engages the inner square end of the spindle.

The clutch head 50 of the take-up spindle 48 engages a companion clutch element 55 formed integral with a gear 56 which is disposed in the compartment 6 and has a stub shaft 57 rotatable in a hole in the closure 10. The clutch element 55 is provided with slanted teeth 58, similar to ratchet teeth, which are disposed in the recesses 51 of the element 50, the sloping surfaces of the teeth engaging against the corresponding surfaces of the recesses 51 to provide a driving connection therebetween. If, during the winding of the film F onto the drum 38, resistance to the rotation of the drum is encountered, due to improper feeding of the film, or from any other cause, slippage between the clutch elements can occur so as to prevent breaking of the film. In other words, the spindle 48 is forced toward the left against the action of the leaf spring 53 to permit relative rotation between the clutch elements, so that excessive pull on the film is prevented.

The gear 56 is driven from a manually rotated gear 59 through idler gears 60 and 61 (Figs. 3 and 6), which have integral stub shafts rotatable in bearing holes in the wall 3 and the closure 10. As shown in Fig. 11, the gear 59 is operatively connected to an element 62 of a Geneva stop motion, the element being secured to an operating shaft 63 which is rotatable in a bearing hole in the cover 10. The outer end of the shaft 63 projects from the cover 10 and has an axial hole 64 and a transverse slot 65. The shaft 63 is adapted to be rotated by means of a handle 66 which has a hub 67 provided with an axial extension adapted to enter the hole 64 and a transverse lug 68 adapted to enter the slot 65 to key the handle and the shaft for simultaneous rotation. Thus, when the handle 66 is connected to the shaft 63 and rotated, the gear 56 is rotated by the train of gears, 59, 60, and 61, to drive the film drum 38 in a direction to wind the film F thereon. After a film-viewing operation, the film can be readily rewound upon the spool 35 by disconnecting the handle 66 from the shaft 63 and connecting it in a similar manner to the spindle 30 and rotating the latter.

The element 62 of the Geneva stop motion has a plurality of teeth 70 which are adapted, when rotated, to successively enter slots 71 of the other element 72 of the motion to index the latter through a portion of a revolution. The element 72 is rotatable on a fixed shaft 73 carried by the cover 10, and is secured to a film-feeding wheel 75 which is retained on the shaft 73 by a bolt 76 (Fig. 12). The wheel 75 passes through an opening 77 in the wall 3 of the casing 2 and is disposed adjacent the lower curved portion 23 of the film guide 21 (Fig. 7), which is concentric with the axis of rotation of the wheel, the film F passing therebetween. The wheel 75 has teeth adapted to engage in the perforations 44 of the film so that, when the wheel is rotated intermittently, the film is fed upwardly toward the wind-up drum with a step-by-step movement, the film following the path shown by full lines in Fig. 7.

It is essential that the transmission of light through the aperture 20 be shut off during the advancing of the film past this aperture to locate a new picture or frame in alignment therewith. The alternate opening and closing of the aperture 20 is effected by a shutter mechanism which includes a shutter lever 80 pivoted at 81 within the compartment 6. The lever 80 has an angular shutter 82 at one end which extends through an opening 83 in the wall 3 into the casing 2 in position to adapt it to extend across the aperture 20. The other end of the lever 80 has a cam follower 84 which rests against a cam 85 (Fig. 9) secured between the gear 59 and element 62 and rotatable therewith. The cam 85 has a plurality of cam lobes 86 which, when the cam is rotated, oscillate the shutter lever 80, the latter being held in engagement with the cam by means of a wire spring 87 having one end attached to the side of the lever and its other end engaging a fixed lug 88 (Fig. 6).

If desired the viewer, as thus far described, can be held in a hand of the operator and directed toward any source of light to cause the light to pass through the aligned apertures 12, 16, and 20, and through the film F. The film is viewed by sighting through the eyepiece, as indicated in Fig. 7. Successive pictures of the film are moved into registry with the apertures and the eyepiece by turning the operating shaft 63 by means of the handle 56, the film then being fed intermittently upwardly toward the take-up drum 32, which is rotated continuously to wind up the film. After the film has been viewed, it can be rewound on the supply spool 35 by first withdrawing it from the guide 21 and feeding wheel 75 and then rotating the spindle 30 by means of the handle 66, to cause the film to travel through the path indicated by dot-and-dash lines in Fig. 7 and in the direction indicated by the broken arrows.

In order to further facilitate viewing the motion picture film, it is desirable that the viewer be held stationary, and this is best attained by mounting the viewer on a support means to be next described. The support means includes a base 90 adapted to rest upon a table or other support 91 and having an aperture in its top portion for receiving the lower reduced end of an upright or standard 93. An angular bracket 94 projecting upwardly from the base 90 has a slot 95 through which the screw shank of a thumbscrew 96 extends, the shank being screwed into a tapped hole in the standard 93 to detachably connect these parts. The upper end of the standard 93 carries a pivot stud 97 on which a holder 98 is pivoted, the holder having an arcuate opening 99 concentric with the pivot and through which a thumbscrew 100 extends. The screw 100 is screwed into a tapped hole in the standard 93, and by loosening the screw the holder 98 can be adjusted angularly. The holder 98 is provided with a curved portion 102 for receiving the casing 2, fingers 103 on the portion 102 serving to prevent rotation of the casing. A thumbscrew 104 (Figs. 1 and 2) passes through holes in the portion 102 and the wall 4 of the casing, and is screwed into a nut element 105 on the casing so that by tightening the screw the viewer is releasably attached to the support means.

The holder 98 is provided with a lateral extension 107 on which a lamp house 108 is mounted. Within the lamp house 108 is an electric lamp 109 which may be connected to an electrical source by wires 110. Light from the lamp 109 is adapted to pass through an opening 111 in the side of the lamp house, the opening being aligned with the aperture 12 of the casing 2 so that the light is projected through the film.

While the film viewing device is herein disclosed as embodied in a preferred form of construction, by way of example, it is obvious that various modifications might be made therein without departing from the spirit or scope of the invention. Therefore, without limiting myself in this respect, I claim:

1. A motion picture viewer, comprising: a casing having an aperture in one wall thereof through which light can pass; an eyepiece in the opposite wall of the casing; a lens within the casing in alignment with and disposed between said aperture and said eyepiece; an oscillatable shutter means disposed between said eyepiece and said lens and adapted to alternately cover and uncover said aperture; a first shaft rotatable in said casing; cam means carried by said shaft and engageable with said shutter means for oscillating said shutter means; spaced rotatable spool spindles within the casing adapted to support film spools, the first of said spools constituting a rewind spool and being adapted to carry a coil of perforated picture film to be viewed, and the second of said spools constituting a wind-up spool and being adapted to receive film unwound from said first spool; guide means for guiding the film past said aperture; a film feeding wheel rotatable in said casing and having teeth engageable in the perforations of the film to feed the same past said aperture; driving means for intermittently rotating said feeding wheel from said first shaft so as to draw film from said first spool with a step-by-step motion; a train of gearing between said first shaft and the spindle for the windup spool; and manually operable means for rotating said first shaft.

2. A motion picture viewer, comprising: a casing having an aperture in one wall thereof through which light can pass; an eyepiece in the opposite wall of the casing; a lens within the casing in alignment with and disposed between said aperture and said eyepiece; an oscillatable shutter means disposed between said eyepiece and said lens and adapted to alternately cover and uncover said aperture; a first shaft rotatable in said casing; cam means carried by said shaft and engageable with said shutter means for oscillating said shutter means; a spring carried by said shutter means and engageable with a fixed lug for maintaining said shutter means in engagement with said cam means, spaced rotatable spool spindles within the casing adapted to support film spools, the first of said spools constituting a rewind spool and being adapted to carry a coil of perforated picture film to be viewed, and the second of said spools constituting a wind-up spool and being adapted to receive film unwound from said first spool; guide means for guiding the film past said aperture; a film-feeding wheel rotatable in said casing and having teeth engageable in the perforations of the film to feed the same past said aperture; driving means for intermittently rotating said feeding wheel from said first shaft so as to draw film from said first spool with a step-by-step motion; a train of reduction gearing between said first shaft and the spindle for the wind-up spool; and manually operable handle means for rotating said first shaft.

FRANCIS T. COFFEY, Sr.

REFERENCES CITED

The following references are of record in the file of this patent:

UNITED STATES PATENTS

| Number | Name | Date |
|---|---|---|
| 1,190,370 | Billings | July 11, 1916 |
| 1,229,697 | Allen | June 12, 1917 |
| 1,450,555 | Lepine | Apr. 3, 1923 |
| 1,517,542 | Doherty | Dec. 2, 1924 |
| 1,557,295 | Johnston | Oct. 13, 1925 |
| 1,774,097 | Hauser et al. | Aug. 26, 1930 |
| 1,844,676 | Owens | Feb. 9, 1932 |
| 1,869,525 | Tideman | Aug. 2, 1932 |
| 1,876,845 | Bowen et al. | Sept. 13, 1932 |
| 2,124,938 | Wittel | July 26, 1938 |
| 2,170,530 | Goldberg | Feb. 8, 1938 |
| 2,384,621 | Isaac | Sept. 11, 1945 |
| 2,481,717 | Blair | Sept. 13, 1949 |

FOREIGN PATENTS

| Number | Country | Date |
|---|---|---|
| 288,547 | Germany | Nov. 6, 1916 |
| 222,613 | Great Britain | Oct. 9, 1924 |
| 253,405 | Italy | June 14, 1927 |